United States Patent [19]

Haendle et al.

[11] 4,433,428
[45] Feb. 21, 1984

[54] DIAGNOSTIC X-RAY INSTALLATION FOR THE REPRESENTATION OF ORGANS

[75] Inventors: Joerg Haendle, Erlangen; Mircea Alexandrescu, Braeuningshof, both of Fed. Rep. of Germany

[73] Assignee: Siemens Aktiengesellschaft, Berlin & Munich, Fed. Rep. of Germany

[21] Appl. No.: 379,292

[22] Filed: May 18, 1982

[30] Foreign Application Priority Data

Jun. 23, 1981 [DE] Fed. Rep. of Germany ....... 3124583

[51] Int. Cl.³ ............................................. G03B 41/16
[52] U.S. Cl. ......................................... 378/95; 378/8; 378/99
[58] Field of Search ................ 378/95, 99, 8; 358/111

[56] References Cited

PUBLICATIONS

R. Brennacke et al. "Digital Processing of Videoangiocardiographic Image Series Using a Minicomputer," IEEE Cat. No. 76 CH1160-1C 1976, pp. 255-260.

*Primary Examiner*—Craig E. Church
*Attorney, Agent, or Firm*—Hill, Van Santen, Steadman & Simpson

[57] ABSTRACT

An exemplary embodiment includes an x-ray image intensifier television chain, an image memory, and a subtraction device which subtracts the stored and the current video signals. A radiographic control device derives control pulses for controlling image storage from the EKG of the patient. A second image memory is connected with the output of the subtraction device. The radiographic control device is connected to both image memories and is designed in such a manner that it triggers the storage at selected different times during a heart cycle.

2 Claims, 1 Drawing Figure

U.S. Patent  Feb. 21, 1984  4,433,428
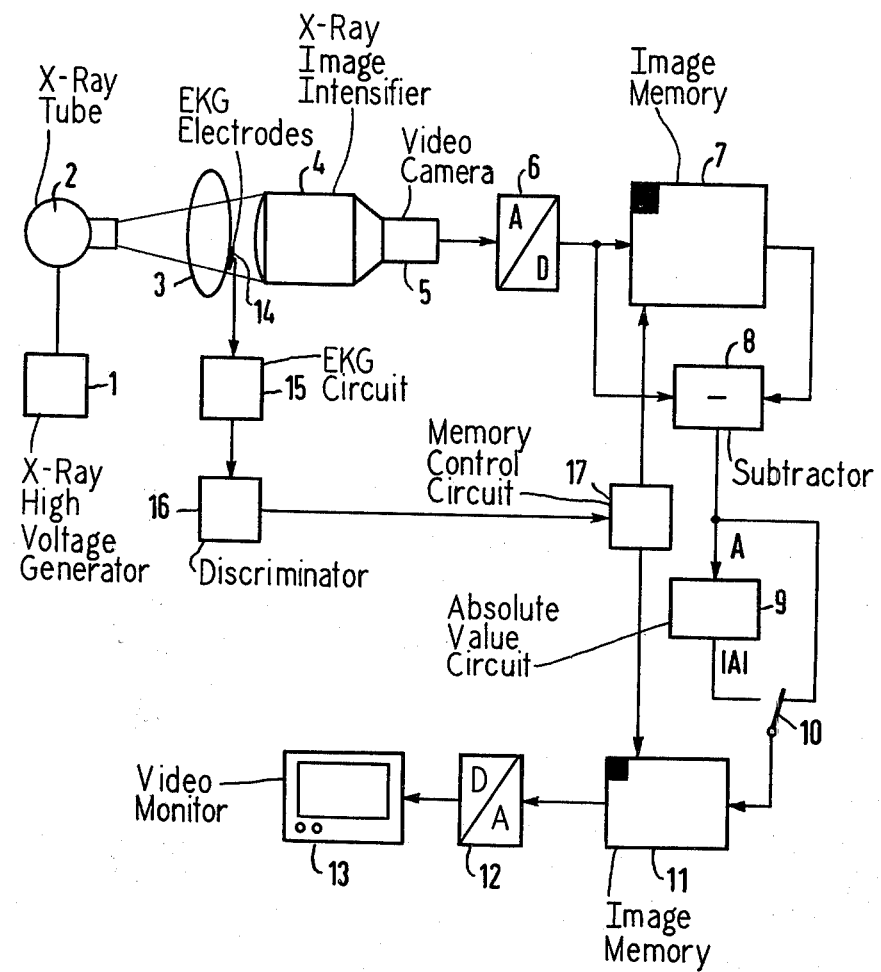

DIAGNOSTIC X-RAY INSTALLATION FOR THE REPRESENTATION OF ORGANS

BACKGROUND OF THE INVENTION

The invention relates to a diagnostic x-ray installation for the representation of organs, comprising an x-ray image intensifier television chain, an image memory, and a subtraction device which subtracts the stored and the current video signals, wherein a radiographic control device derives control pulse for the image storage from the EKG of a patient.

In the publication IEEE Catalog No. 76CH1160-1C, 1976, on pages 255 to 260, in the article "Digital Processing of Videoangiocardiographic Image Series Using a Minicomputer", by R. Brennecke et al., a diagnostic x-ray installation of this type is described wherein, synchronously with a given heart phase, several images are integrated and stored in the image memory. Subsequently, an injection of an x-ray contrast medium takes place. The images following the injection are likewise integrated in a heart-phase-synchronous fashion and subtracted from the first stored integration values. The thus-obtained subtraction image is represented on a monitor and shows the organ to be examined, for example, the heart. It has been shown to be disadvantageous in this case that a contrast agent must be injected which burdens the patient. Alsom the organ to be examined is shown at a fixed time. The movement of the heart wall can e.g. not be recognized in this case.

SUMMARY OF THE INVENTION

The invention proceeds from the object of producing a diagnostic x-ray installation of the type initially cited which renders possible a representation of margins of moved organs, for example, the heart, also without contrast medium.

In accordance with the invention, the object is achieved in that a second image memory is connected with the output of the subtraction device and that the radiographic control device is connected to both image memories and is designed in such a manner that it triggers an image storage operation at selected different times of a heart cycle. Two x-ray images pertaining to different heart phases are thereby retained in the second memory so that one can recognize the movement of the organ from the subtraction image.

The movements can be selectively represented in the same or opposite attenuation stages if a changeover switch is provided which supplies to the second image memory either an output signal of the subtraction device or an output signal of a circuit which forms the absolute values of the output signal of the subtraction device.

The invention shall be explained in greater detail in the following on the basis of an exemplary embodiment illustrated in the Figure on the accompanying drawing sheet; and other objects, features and advantages will be apparent from this detailed disclosure and from the appended claims.

BRIEF DESCRIPTION OF THE DRAWING

The single FIGURE is a diagrammatic illustration of a diagnostic x-ray installation in accordance with the present invention.

DETAILED DESCRIPTION

In the FIGURE, an inventive diagnostic x-ray installation with a high voltage generator 1 is illustrated which supplies an x-ray tube 2, in the ray path of which a patient 3 is disposed. An x-ray image intensifier 4, receiving the transmitted x-ray beam, is connected with a television camera 5 whose output signal is supplied to an analog-to-digital converter (A/D-converter) 6. The digitized video signal is read into a first image memory 7. The output of the image memory 7 is connected with a subtraction device 8 to which also the current video signal from the A/D converter 6 is supplied. The subtraction device 8 forms the difference (pixel by pixel) between the image point data of the digitized video signal which is stored in the image memory 7 and the corresponding image point data of the signal being supplied by the analog-to-digital converter 6. The output signal A of the subtraction device 8 is supplied to a circuit 9 which forms the absolute values $|A|$ of the image point data from the subtraction device 8. The absolute value $|A|$ from the circuit 9 is supplied to the one input terminal of a changeover switch 10, to the other switching terminal of which the output signal A from the subtraction device 8 is connected directly. The output terminal of switch 10 is connected with a second image memory 11. The output of the image memory 11 is connected to a digital-to-analog converter (D/A converter) 12 whose analog output signal is displayed on a monitor 13.

EKG-electrodes 14 are applied on the patient 3, which electrodes are connected with an EKG circuit 15. The EKG signal of the EKG circuit 15 is supplied to a discriminator 16 for monitoring the amplitude and phase of the EKG signal. The discriminator 16 is connected with a memory control device 17 which effects a storage into the two image memories 7 and 11.

The discriminator 16 can, for example, be comprised of a threshold circuit for selecting a desired amplitude level and a phase shifter, for example, a monostable flip-flop. One hereby obtains a control pulse from the R-wave of the EKG signal. The memory control device 17 can, for example, be comprised of two AND circuits, a delay line, and two interlocking switch systems. The vertical pulses of the television camera are here supplied to the first inputs of the two AND circuits. The output signal of the discriminator 16 is directly supplied to the second input of the AND circuit which controls the first image memory 7. The output signal of the discriminator 16 is supplied, via a delay line, to the second input of the second AND circuit which controls the second image memory 11. Connected with the outputs of the AND circuits are the interlocking members which, for example, prevent a multiple triggering of the respective associated storage. The interlocking members can be constructed from bistable flip-flops. A further posssibility of the radiographic control can also be achieved in that the discriminator 16 is present twice and the one part responds to the R-wave and the other part to the T-wave. These two respective output signals could be directly supplied to the respective image memories 7 and 11 via respective interlocking members.

After switching on the fluoroscopy mode, the digital video signals are supplied at the output of the A/D converter 6 Derived from the R-wave, the memory control device 17 effects, synchronously with the vertical pulses of the Video signal, the storage of an image into the first image memory 7. There subsequently follows the difference formation in the subtraction device 8 of the stored and the immediate video signals. Delayed by the delay line present in the memory control device 17, or derived from the T-wave, the read-in of the output signal A of the subtraction device 8 into the image memory 11 is effected. On the monitor image the phases in which the heart has become enlarged appear as white locations, and the locations at which the heart has become smaller appear as black locations. If, by contrast, the circuit 9 between the subtraction device 8 and the second image memory 11 is switched in, then all movements on the monitor image appear black Also several images can be correspondingly integrated in a heart phase-controlled fashion and read into the image memories 7 and 11, so that the noise component is decreased.

The circuit 9 can be dispensed with if the difference stage 8 is constructed from digital modules, for example, from two integrated switching circuits of the type SN 74 A 181. The connection of the sign bit is, in this case, controlled by the changeover switch 10. If an amount value formation is to take place, then it connects a positive sign to the sign input of the image memory 11, whereas, in the other instance, it connects the sign output of the subtraction device 8 with the sign input of the second image memory 11.

With this diagnostic x-ray installation, external heart boundary movements can be represented without a contrast medium. If nevertheless, a contrast medium injection is conducted, then it is also possible to thereby detect wall movements, for example, of the ventricle or of blood vessels.

It will be apparent that many modifications and variations may be made without departing from the scope of the teachings and concepts of the present invention.

Supplementary Discussion

For the case where there are n pixels in an image, a digital image stored by image memory 7 during an image interval following a R-wave signal from control 17, may be represented as $R_n$. At the time of the supply of the delayed T-wave signal from control 17, a digital video signal is supplied by converter 6 which may be represented as Tn. The stored image $R_n$ may be supplied from image memory 7 pixel by pixel to subtractor 8 during each video image cycle, for example, so that at the occurrence of the T-wave signal from control 17, a difference signal will be supplied from subtractor 8 and stored in the image memory 11 (with a polarity corresponding to a white or a black presentation of the moving margins of the heart depending on the position of switch 10).

We claim as our invention:

1. A diagnostic x-ray installation for the representation of organs, comprising an x-ray image intensifier television chain (4, 5), an image memory (7) for storing video signals, and a subtraction device (8), which subtracts the stored video signals and the current video signals, wherein a radiographic control device (15, 16, 17) derives control pulses for controlling the image storage from an EKG signal of a patient (3), characterized in that a second image memory (11) is connected with the output of the subtraction device (8), and that the radiographic control device (15, 16, 17) is connected to both image memories (7, 11) and is designed in such a manner that it triggers the storage at various times of a heart cycle.

2. A diagnostic x-ray installation according to claim 1, with an absolute value circuit (9) for forming an absolute value of an input signal, characterized in that a changeover switch (10) is provided connected with the subtraction device (8) and with the absolute value circuit (9), and having output means connected with the second image memory (11) for selectively supplying to the latter an output signal (A) of the subtraction device (8) and an output signal of the absolute value circuit (9) in the form of absolute values ($|A|$) of the output signal (A) of the subtraction device (8).

* * * * *